May 17, 1955  A. WOLESLAGLE  2,708,525
TOOL SUPPORTING DEVICE FOR TREES, POLES, AND THE LIKE
Filed May 6, 1950  2 Sheets-Sheet 1
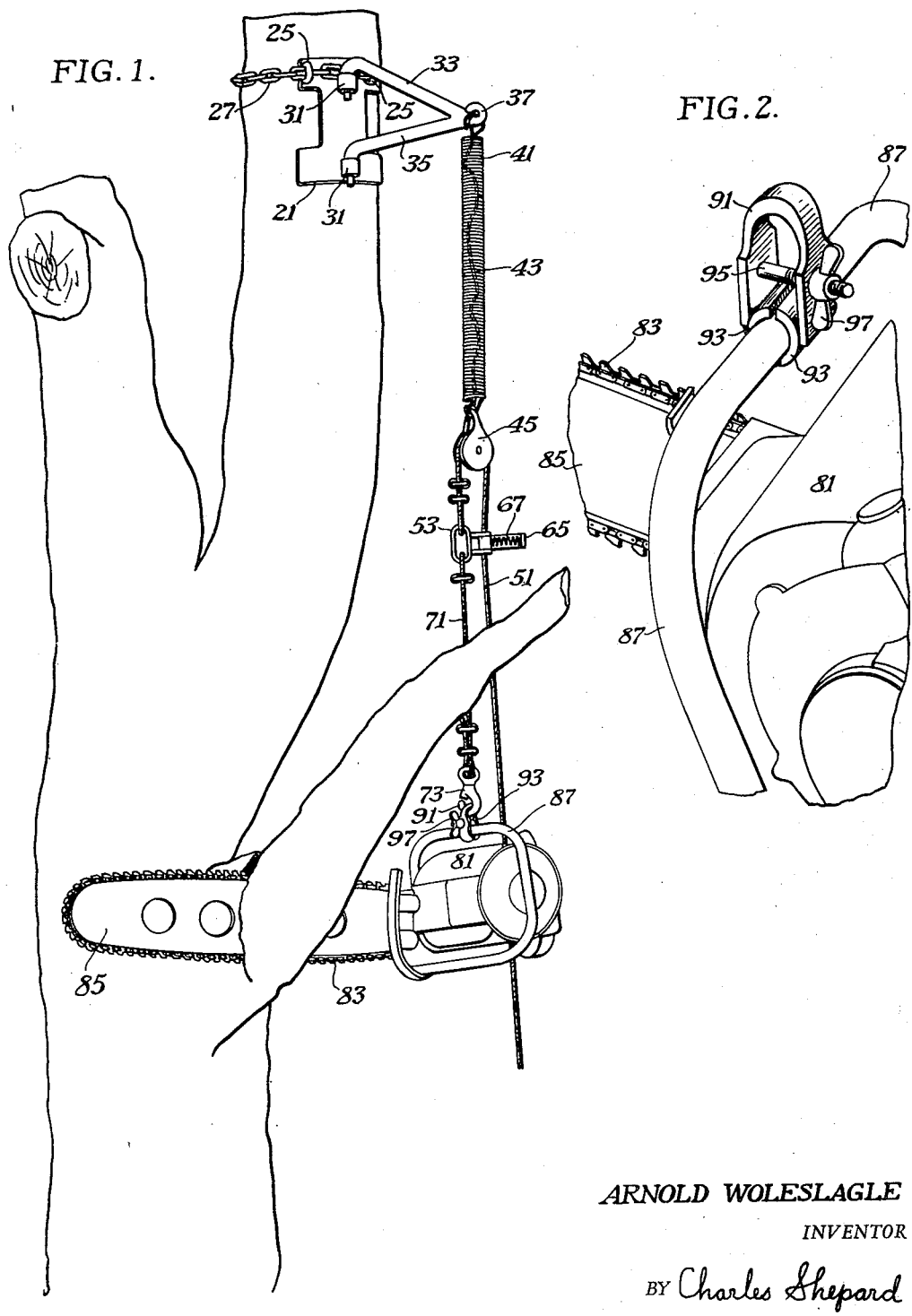
ARNOLD WOLESLAGLE
INVENTOR
BY Charles Shepard
ATTORNEY

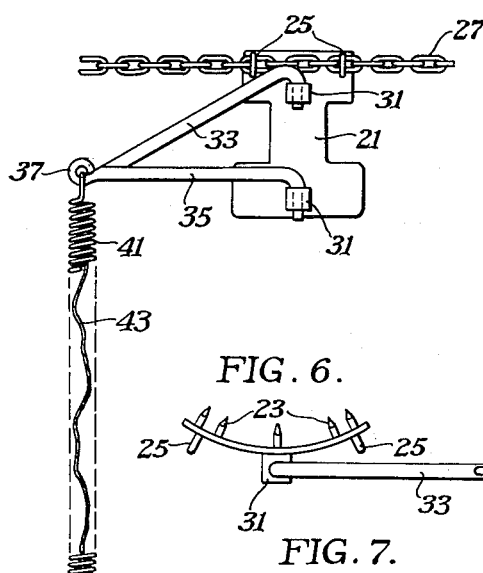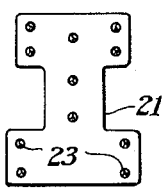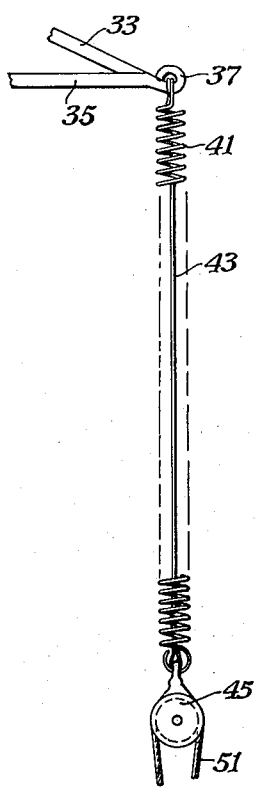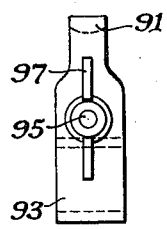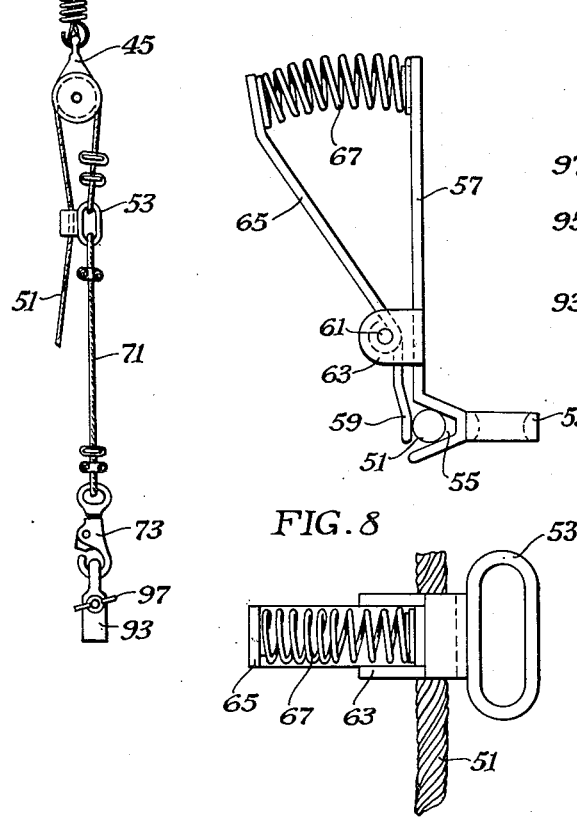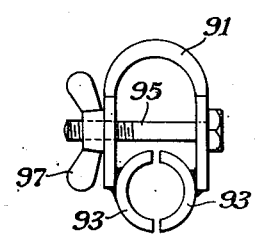

United States Patent Office 2,708,525
Patented May 17, 1955

2,708,525

TOOL SUPPORTING DEVICE FOR TREES, POLES, AND THE LIKE

Arnold Woleslagle, Springwater, N. Y.

Application May 6, 1950, Serial No. 160,433

4 Claims. (Cl. 212—61)

The present invention relates to a device for holding tools or equipment while performing work upon trees, poles, or other elevated structures.

In the course of the work of a tree surgeon or in the course of installation or maintenance of electric power lines, telephone lines, etc., it is frequently necessary to use tools at a considerable elevation above the ground. Small hand tools such as a small hammer or a pair of pliers or wire cutters can often be used by the lineman or tree surgeon without special trouble or precaution. But if it is desired to use heavier and more bulky tools, especially power driven tools such as power driven chisels, saws, or boring machines, the weight and bulkiness of these items are such that they are awkward and clumsy to handle if supported entirely by the arms of the workman, bearing in mind that the workman himself is in a precarious position at a substantial elevation above the ground, and the hazard of dropping the power tool plus the awkwardness and difficulty of handling the same are such that many linemen and tree surgeons prefer to use small light hand tools powered by human muscles, rather than the quicker and more efficient but heavier and bulkier power driven tools which are now available. Even when it is attempted to take a power driven tool aloft by means of a rope attached to the tool, this is not a satisfactory solution of the problem because it is still difficult to adjust the tool to the exact elevation required for boring a hole or making a cut in a given location, in addition to which there is the further factor that frequently (as for example when working near the top of a pole, or above the highest large limb on a tree) there is no convenient place to attach a rope for supporting the power driven tool.

Accordingly, an object of the present invention is to provide simple, effective and inexpensive mechanism for supporting power driven tools or other items of equipment, at desired elevations on trees, poles, and the like.

Another object is the provision of such mechanism in a form which can be easily and quickly attached to the tree, pole, etc., and which, when once attached, will serve to support the tool in many different locations of possible use, without requiring relocation of the supporting mechanism.

Still another object is the provision of supporting mechanism of the above general character, so designed that the tool or other equipment to be supported may be easily and quickly adjusted to the proper location, and may also have some small degree of further movement after adjustment, both for the purpose of exactly alining the tool with the intended hole or cut where it is to work, and for the purpose of enabling the tool to shift bodily to the necessary extent while cutting through a laterally extending limb, for example.

A further object of the invention is the provision of mechanism having the above features which is, at the same time, so designed as to be sufficiently light for easy carrying up the tree or pole, and yet which has such a sturdy construction with such safety features as to eliminate any substantial danger of breakage or other accident.

These and other desirable objects are accomplished by the construction disclosed as an illustrative embodiment of the invention in the following description and in the accompanying drawings forming a part hereof, in which:

Fig. 1 is a diagrammatic side elevation of a fragment of a tree, showing a perspective view of the present invention in use in supporting a power driven saw cutting through a limb of the tree;

Fig. 2 is a perspective view of a portion of the power driven saw showing an attaching clamp which constitutes part of the present invention;

Fig. 3 is a side elevation of the supporting mechanism of the present invention with the coil spring in its retracted position and with part of the coil spring broken away to show the safety cable inside;

Fig. 4 is a view similar to a fragment of Fig. 3 with the coil spring in its maximum extended position;

Fig. 5 is a rear face view of the mounting plate constituting part of this invention;

Fig. 6 is a top plan view of the mounting plate and the supporting crane;

Fig. 7 is a top plan view of the supporting line clamp constituting part of the present invention;

Fig. 8 is an end elevational view thereof;

Fig. 9 is a side elevational view of a clamp for attachment to a saw or similar piece of equipment, being the same clamp shown in Fig. 2; and Fig. 10 is a side elevational view thereof, from another direction.

The same reference numerals throughout the several views indicate the same parts.

Referring first to Figs. 1 and 3-6, the invention comprises in general a main mounting plate 21 of somewhat curved or arcuate form to fit aproximately against a part of the circumference of the tree trunk, telephone pole, etc., with which the device is to be used. Several arcuate plates 21 having different radii of curvature may be supplied, if desired, although this is usually not necessary because it is not essential to have the curvature of this plate fit accurately against the circumference of the pole or tree trunk.

On the rear or concave face of the main plate 21 there are a number of sharp pointed spikes or studs 23 (Figs. 5 and 6) which will dig into the pole or tree trunk when the plate is banged sharply against the same, so as to prevent downward slipping of the mounting plate on the pole or tree. To save weight while at the same time giving the plate the necessary extreme vertical dimensions and horizontal dimensions for stability against rocking, tilting, or otherwise shifting its position, the plate is conveniently made in the general form of the letter H turned on its side, as well seen in Figs. 1, 3, and 5. Four of the sharp spikes 23 are located approximately at the four corners of the bottom cross bar portion of the main plate.

On the front or convex face of the plate, near the top edge thereof, are two large stout eyes 25, through which passes a length of chain 27 intended to be wrapped circumferentially around the tree or pole, and held reasonably tightly by any suitable conventional chain hook or other chain fastening device of simple form which can be easily attached or unfastened. Also on the front or convex side of the plate 21 are two large eyes 31 with their openings extending vertically and alined vertically with each other. One of these is near the top (just slightly below the chain 27) and the other near the bottom edge of the plate 21, both at the approximate vertical center line of the plate. These eyes 31, like the eyes 25, may conveniently be welded securely to the face of the plate 21. These eyes 31 form bearings or trunnions for vertically extending pivot portions at the respective inner ends of the upper leg 33 and lower leg 35 of a crane or bracket, the two legs 33 and 35 converging to join each other at their outer extremities and being securely fastened together as by welding or as by being formed integrally from a single piece of metal.

An eye 37 at the outer end of the crane receives the eye at the upper end of a coil spring 41, extending through the length of which spring is a flexible safety cable 43 the upper end of which is securely looped through the same crane eye 37. The lower eye of the coil spring and the lower end of the safety cable are both securely fastened through the supporting eye of a block or pulley 45.

When the spring 41 is in its normal retracted position, not under substantial tension, the safety cable 43 is quite loose inside the spring. There is sufficient slack in the cable to allow the spring to expand or distend to a reasonable distance. For example, the spring itself may conveniently be about 24 inches to 30 inches in length, in its relaxed or retracted position, when the coils of the spring are tight against each other, and the safety cable may have such length as to allow the spring to expand through a distance of about 10 to 12 inches. The cable serves not only to limit the permissible extension or distension of the spring, so that it will not be accidentally overloaded and acquire a permanent set, but also to provide a safety feature in case the spring breaks, since a spring is notoriously subject to breakage and even great care exercised in the manufacture of a spring does not obviate unexpected breakage. But the safety cable in the present instance is attached directly to the supporting crane at one end and to the block 45 at the other end, so that even if one of the eyes breaks off of the spring 41 (which is a common occurrence with coiled springs) the block 45 is still safely supported from the crane.

A rope or cable 51 extends through the block 45 and over the pulley thereof, this member 51 constituting the main supporting line and adjusting line of the tool or other equipment or appliance to be supported by the present structure. The short end of the line 51 is securely fastened to the upper end of a large eye 53 on an adjusting clamp device, this eye having at one side a vertically extending deep groove or channel 55 of wedge-shaped or tapered cross section, and a handle portion 57 which extends a substantial distance horizontally from the vertical groove or channel 55. The other or long end of the line 51 runs through this channel 55 and is held therein by the short end 59 of a clamping lever, pivoted intermediate its ends at 61 on ears 63 extending laterally from the handle 57. The longer end 65 of the clamping lever extends in the same general direction as the handle 57, but diverging somewhat therefrom as shown in Fig. 7, and at the free ends of the parts 57 and 65 there is a coiled compression spring 67 which tends constantly to separate the members 57 and 65 from each other, thus tending to force the clamping member 59 tightly against the line 51 in the groove 55.

By grasping the members 57 and 65 and squeezing them together against the force of the spring 67, the clamping lever is released from the line 51 so that the line 51 may slide along the groove or channel 55, and thus the line may run in one direction or the other over the block 45 and the elevation of the clamping device 53—67 may thus be changed. It will be noted that the channel 55 has sloping sides in which the line 51 is tightly wedged by the pressure of the clamping lever 59, so that the line is securely held against longitudinal running through the clamping groove even when a relatively light spring 67 is employed. Thus it is comparatively easy to compress the spring 67 and loosen the line for adjusting the clamp upwardly or downwardly with respect to the block 45, but whenever the manual grip on the clamp is released, the clamp automatically becomes effective and locks the line 51 securely.

The lower end of the eye 53 of the vertical adjustment clamp has threaded through it the upper end of a short supporting cable 71, conveniently having a length of about 18 to 24 inches, the lower end of which cable 71 is provided with a suitable snap fastener 73 by which it may be quickly attached to and detached from any desired piece of equipment.

One of the most useful things which may be easily supported and manipulated by means of the present invention, is a power driven saw of the chain saw type. In a tree surgeon's work where many limbs, some of them relatively large, are to be cut, the use of a power driven chain saw is of tremendous advantage in saving time and effort, but due to the weight of power driven saws, and the difficulty of handling them high above the ground, tree surgeons in the past have usually been reluctant to take them aloft. But with the present invention, the use of a power driven chain saw is quite easy and practical.

A saw of this type may comprise, for example, a motor 81 of either the electric or preferably the internal combustion type, driving a saw tooth chain 83 which runs around the periphery of a plate-like guide 85. Saws of this type, as currently available on the market, usually include a tubular or bar handle 87 (Figs. 1 and 2) extending horizontally across the top of the apparatus and down the sides, the upper horizontal part of which is located approximately at the balance point of the apparatus. In order to be able to handle effectively a saw of this kind the present invention provides a novel form of clamp for clamping onto the upper horizontal reach of the conventional handle 87, which clamp may be easily shifted along the handle 87 to one position or another in order to get the saw to hang just the way the user may desire. This saw handle clamp, as best seen in Figs. 2, 9, and 10, comprises a metal part 91 of generally inverted U-shaped form, having at the extreme ends of the side bars or arms of the U, a pair of opposed arcuate members 93 constituting, in effect, two halves of a split sleeve of the proper diameter to fit fairly snugly around the conventional saw handle 87. A cross bolt 95 extends across the arms of the U-shaped member 91 a little above the members 93, and is tightened by a wing nut 97.

When initially installing this clamp, the wing nut 97 is loosened all the way and the two members 93 are pried apart sufficiently far so that they may slip over the handle bar 87. Then the wing nut 97 is tightened, thereby holding the clamp in the desired location lengthwise along the handle 87. By slightly loosening the wing nut 97, the clamp may be shifted along the handle 87 to one position or another, to get the saw to hang in just the way desired. The snap fastener 73 is snapped through the loop at the upper part 91 of the saw handle clamp, to support the saw from the supporting cable 71.

Whenever it is desired to use the saw on the ground, the snap fastener 73 is unsnapped and the saw is then ready for use in the normal conventional manner. This handle clamp is so small and light that it does not appreciably interfere with normal use of the saw, and so there is no necessity of removing this clamp from the saw handle when the saw is to be used in the conventional manner, but it may be left on the handle all the time, ready for instant use of the saw aloft.

With this construction, it is seen that a power saw or any other desired machinery or equipment, regardless of weight (within reasonable limits, of course) may be supported at any desired point on the height of a tree or pole, without any necessity for finding a convenient branch over which to run a supporting rope. The operator who is to run the saw or other equipment, usually being located at about the level of the equipment, can easily reach up to the adjusting clamp 53—67 and grasp it to loosen the clamp for raising or lowering the equipment to the desired general location. In making a vertical cut through a laterally extending limb, as in Fig. 1, the saw can be adjusted to the proper location to start the cut; then as the cut progresses downwardly the operator can bear down on the saw a little with his own weight, thus stretching the spring 41 and allowing the saw to move bodily downwardly as the cut progresses.

Because of the swinging crane 33, 35, the saw or other equipment can easily be swung to other locations circumferentially around the tree or pole, and it is seldom necessary, when once the mounting plate 21 has been placed in position, to move it to any other position on the tree or pole. Only in extreme cases is there any need to swing the mounting plate around to the other side of the tree or pole. The swinging of the crane 33, 35 will take care of a considerable range of movement circumferentially around the tree, and any additional circumferential range can be taken care of by wrapping the supporting line obliquely around the tree to some extent, particularly if the saw or other equipment is located at a substantial distance below the supporting crane.

The apparatus may be used, of course, not only for supporting tools which are to be used aloft, but also for hoisting or holding, while being fastened in place, any objects which are to remain permanently in an elevated position on a tree, pole, etc.; for example, telephone crossarms or electric power transformers. Moreover, the crane 33, 35, may be simply lifted out of its supporting eyes or bearings 31 and may be replaced by another crane having longer or shorter arms or arms differently formed; for example, having arms broadened horizontally in a lateral direction to provide a seat on which a workman may sit while performing tasks at an elevated location.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A construction for supporting equipment from trees and poles, said construction including a bracket arm mounted for approximately horizontal swinging movement, and further including a coiled tension spring arranged approximately vertically and supported at its upper end from said bracket, a pulley block supported from the lower end of said spring, a flexible safety cable connected to said bracket and to said block to limit expansion of said spring and to support said block from said bracket in the event of breakage of said spring, a flexible element running through said block for supporting equipment at variable distances from said block, said flexible element hanging in two falls from said pulley block, and a clamping device secured to one of said falls and releasably engaging the other of said falls for holding the two falls in any selected adjusted position with respect to each other, said clamping device including a spring normally clamping said device tightly on said other of said falls and requiring manual pressure to release it to permit said other of said falls to move longitudinally relative to said clamping device.

2. A construction as defined in claim 1, in which said clamping device includes a member having a slot with wedging side walls for receiving said other of said falls, and releasable spring-pressed part normally engaging said other fall and pressing it into said slot to wedge it tightly therein.

3. A construction as defined in claim 2, in which the equipment to be supported includes a handle having a horizontally elongated portion, and in which said construction further includes a second clamping device adjustable along and releasably clampable in a plurality of selected positions on said elongated portion of said handle, and supporting means for supporting said second clamping device from one of said falls.

4. A construction as defined in claim 3, in which said supporting means connects said second clamping device to and supports it from said first mentioned clamping device.

References Cited in the file of this patent

UNITED STATES PATENTS

| Number | Name | Date |
|---|---|---|
| 852,258 | Collins et al. | Apr. 30, 1907 |
| 1,247,706 | Moran | Nov. 27, 1917 |
| 1,256,688 | Hall | Feb. 19, 1918 |
| 1,285,657 | Finucan | Nov. 26, 1918 |
| 1,493,189 | Carmeroto | May 6, 1924 |
| 1,700,030 | Davey et al. | Jan. 22, 1929 |
| 1,702,337 | Davey et al. | Feb. 19, 1929 |
| 2,153,803 | Jerabek | Apr. 11, 1939 |
| 2,541,767 | Jones | Feb. 13, 1951 |
| 2,555,428 | Tuttle | June 5, 1951 |